United States Patent [19]
Tomatsuri

[11] 3,905,526
[45] Sept. 16, 1975

[54] CAMERA PROTECTOR MEMBER FOR USE WITH A SUSPENSION RING FOR CAMERA

[75] Inventor: Masakazu Tomatsuri, Tokyo, Japan
[73] Assignee: Nippon Kogaku K.K., Tokyo, Japan
[22] Filed: Dec. 21, 1973
[21] Appl. No.: 427,328

[30] Foreign Application Priority Data
Dec. 28, 1972 Japan.................................. 48-4777

[52] U.S. Cl............................ 224/5 V; 24/265 AL
[51] Int. Cl. ................................................. A45f 5/00
[58] Field of Search............ 224/5 V, 5 R, 5 A, 5 B, 224/5 H, 25 R; 24/265 AL, 265 H

[56] References Cited
UNITED STATES PATENTS

| | | | |
|---|---|---|---|
| 2,136,357 | 11/1938 | Darling et al................... | 224/5 V X |
| 2,578,237 | 12/1951 | Geistweit............................ | 224/5 A |
| 3,175,862 | 3/1965 | Robbins...................... | 24/265 AL X |
| 3,741,092 | 6/1973 | Bohanec........................ | 224/5 V X |

Primary Examiner—Robert J. Spar
Assistant Examiner—Donald W. Underwood
Attorney, Agent, or Firm—Fitzpatrick, Cella, Harper & Scinto

[57] ABSTRACT

A protector member for use with a camera having a pendant to which is connected a suspension ring releasably connected to the turned-back portion of a strap comprises a member formed with an opening portion through which the turned-back portion of the strap is passed and in which the pendant is engaged. The protector member is disposed between the camera body and the suspension ring and engaged with the pendant and the turned-back portion of the strap through the opening portion. Thus, the protector member prevents occurrence of the camera body and the suspension ring.

3 Claims, 2 Drawing Figures

3,905,526

CAMERA PROTECTOR MEMBER FOR USE WITH A SUSPENSION RING FOR CAMERA

BACKGROUND OF THE INVENTION

1. Field of the Invention

This invention relates to a protector member for protecting a portion of a camera body adjacent a suspension ring against injuries which would otherwise be imparted thereto by the suspension ring when the camera is being used with a strap attached to a pendant of the camera by means of the suspension ring.

2. Description of the Prior Art

Various types of such protector members have been devised heretofore.

One of them is a protector member which has one end fixed to a strap by caulking and the other end formed with an opening portion for passing therethrough a pendant. The pendant is inserted into the opening portion of the protector member, and a suspension ring connected to the strap is engaged with the pendant with the protector member interposed therebetween, thereby preventing contact between the camera body and the suspension ring.

Another type is a doughnut-shaped protector member having an opening formed centrally thereof. The pendant is inserted into the central opening of the protector member and a suspension ring connected to a strap is connected to the pendant with the protector member interposed therebetween, thereby preventing contact between the camera body and the suspension ring.

The former type of protector member lacks interchangeability because the protector member is fixed to the strap by caulking. In addition, the portion of the protector member subjected to the caulking tends to be bulky enough to interfere with the manipulation of the camera, and such protector member is cumbersome and expensive to manufacture. The latter type of protector member is free to rotate about the pendant and must necessarily be large enough to prevent any contact between the suspension ring and the camera body even if the protector member is rotated about the pendant. Such large protector member adds to the cumbersomeness in manipulation of the camera.

SUMMARY OF THE INVENTION

The present invention intends to provide a protector member which eliminates all the above-noted disadvantages.

The protector member according to the present invention is adapted for use with a camera having a pendant to which is connected a suspension ring releasably connected to the turned-back portion of a strap and is intended to prevent contact between the body of the camera and the suspension ring. The protector member comprises a member formed with an opening portion through which the turned-back portion of the strap is passed and in which the pendant is engaged. The protector member is disposed between the camera body and the suspension ring and engaged with the pendant and the turned-back portion of the strap through the opening portion. Thus, any contact between the camera body and the suspension ring may be prevented.

The opening portion of the protector member may comprise an opening through which the turned-back portion of the strap is passed, and an opening in which the pendant is engaged. The protector member may preferably be formed of leather.

The invention will become more fully apparent from the following detailed description of an embodiment thereof taken in conjunction with the accompanying drawings.

DESCRIPTION OF THE PREFERRED EMBODIMENTS

Figure 1:
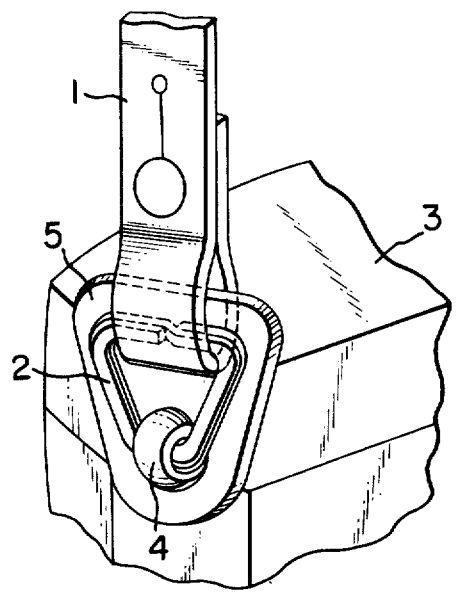
FIGS. 1 and 2 are perspective view and an enlarged detail, respectively, of the protector member according to an embodiment of the present invention.
Figure 2:
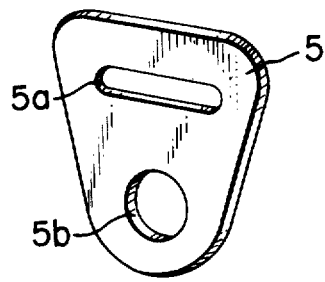

Referring to FIGS. 1 and 2, a strap 1 has its end portion turned back over a suspension ring 2 and releasably fastened by a snap fastener or like mating means. The suspension ring 2 connects the strap 1 to a pendant 4 and is removable from the pendant 4. A protector member 5 is formed with an opening 5a through which the strap 1 may be passed, and an opening 5b in which the pendant 4 may be engaged. The protector member 5 is disposed between the suspension ring 2 and a camera body 3. Thus, by removing the mating means from the turned-back portion of the strap 1 and by removing the suspension ring 2 from the pendant 4, the protector member 5 is removable with respect to the strap 1 and the pendant 4.

Thus, the protector member 5 according to the present invention is excellent in interchangeability because it is readily removable with respect to the strap 1 and the pendant 4 without any special design added to the strap and/or the pendant. Moreover, when in use, the protector member is confined within the space defined by the turned-back portion of the strap 1, thus presenting no bulkiness. Also, the unitary connection between the strap 1 and the suspension ring 2 is useful to minimize the configuration of the protector member and accordingly, prevent it from interfering with manipulation of the camera.

In the shown embodiment, the protector member 5 is formed with two openings 5a and 5b, but if the protector member is formed of a harder material such as shaped polyethylene or the like, a single common opening instead of the two separate openings may be formed in the protector member to obtain the same result as that described above.

If formed of leather, the protector member of the present invention will be especially effective.

I claim:

1. In combination with a camera body having a pendant extending therefrom;
   a suspension ring passing through and connected with said pendant,
   a strap having a turned-back portion at the end thereof and releasably connected to said suspension ring by said turned-back portion,
   a protector member having an aperture, said member being disposed between said camera body and said suspension ring with said pendant and said turned-back portion of said strap passing through said aperture and thereby preventing contact between said camera body and said suspension ring.

2. Mechanism according to claim 1, wherein two apertures (5a, 5b) are formed in said protector member, through one of which said turned-back portion of said strap is passed, and through the other of which said pendant is engaged.

3. Mechanism according to claim 2, in which said protector member is formed of leather.

* * * * *